April 18, 1961  D. PERLMAN  2,980,591
PREPARATION OF COBALAMINS
Filed Jan. 22, 1957
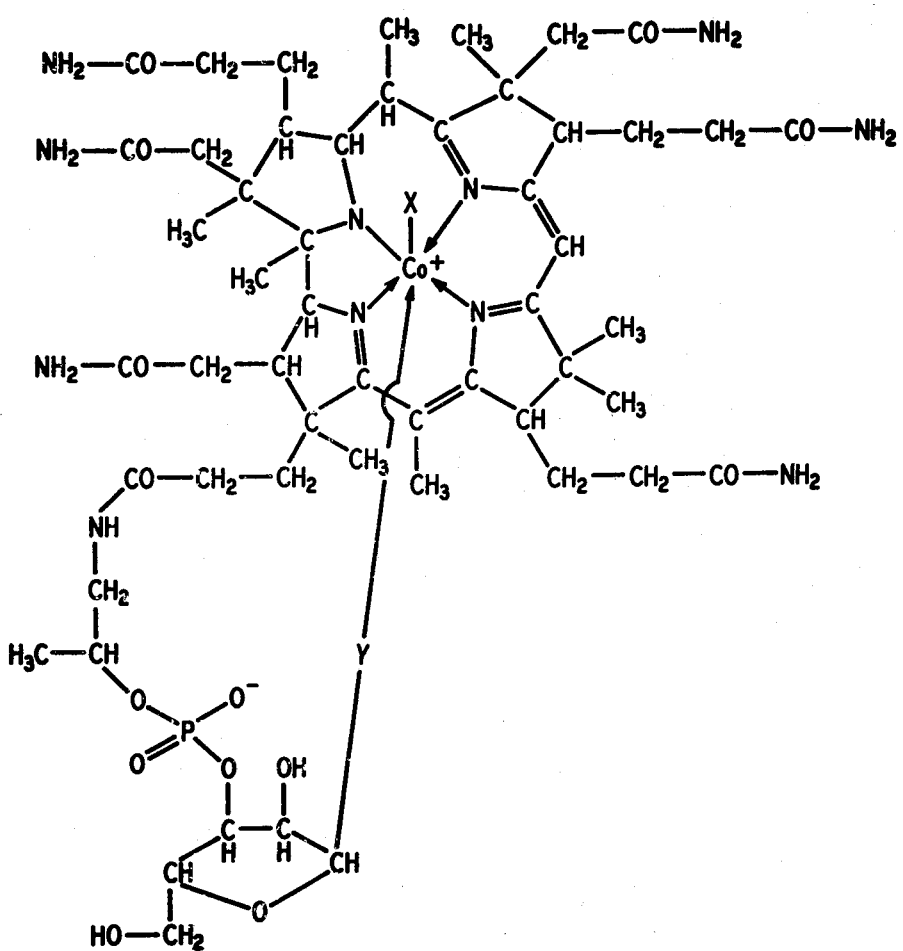
DAVID PERLMAN Inventor
By
Lawrence S. Levinson Attorney

United States Patent Office 2,980,591
Patented Apr. 18, 1961

2,980,591

PREPARATION OF COBALAMINS

David Perlman, Princeton, N.J., assignor to Olin Mathieson Chemical Corporation, New York, N.Y., a corporation of Virginia Filed Jan. 22, 1957, Ser. No. 635,299

13 Claims. (Cl. 195—65)

This invention relates to an improved process for preparing physiologically active cobalamins.

Prior to this invention, it was known that physiologically active cobalamins could be prepared biosynthetically by culturing certain microorganisms in a nutrient medium containing a precursor, the nature of the precursor being determined by the particular cobalamin product desired. Thus, in the preparation of vitamin $B_{12}$ [5,6-dimethyl-benzimidazole-cyano-cobalamin, employing the nomenclature of Bernhauer et al., Angew. Chemie, 66, 776 (1954)] by the cells of a microorganism such as Escherichia coli in a nutrient medium, the two precursors, 5,6-dimethylbenzimidazole and Ford's factor B had to be added to the medium [Ford et al., Biochemical Journal, 59, 86 (1955)].

This known process suffered the disadvantages of being relatively expensive due to the inherent inefficiency of the fermentation process, as a large excess of precursors had to be utilized.

It is the object of this invention, therefore, to provide an improved process for the preparation of physiologically active cobalamins which is more efficient and more adaptable than those priorly known.

These objects are achieved by the process of this invention, which essentially comprises culturing a precursor-requiring vitamin $B_{12}$-producing microorganism (particularly precursor-requiring vitamin $B_{12}$-producing microorganisms of the genus Propionibacterium) in a cobalt-containing nutrient medium substantially free of precursor, separating the cells from the medium, treating the separated cells with a precursor and recovering the resulting physiologically active cobalamin.

Among the microroganisms which may be employed in the practice of this invention are those known to produce vitamin $B_{12}$ in the presence of a 5,6-dimethylbenzimidazole-containing nutrient medium but which fail to elaborate the vitamin when the nutrient medium is substantially free from the precursor. Examples of such microorganisms include various species of Propionibacterium, as exemplified by Propionibacterium arabinosum, Propionibacterium pentosaceum, Propionibacterium zeae, Propionibacterium thoenii, Propionibacterium rubrum and Propionibacterium peterssonii.

The nutrient media useful in the first step of the process of this invention include the usual sources of assimilable carbon, nitrogen and cobalt. As sources of assimilable carbon, there may be used: (1) carbohydrates, such as glucose, fructose, sucrose, maltose, dextrins and soluble starches; (2) substances containing carbohydrates, such as corn steep liquor and grain mashes; (3) polyhydric alcohols, such as glycerol; (4) fats, such as lard oil, soybean oil, linseed oil, cottonseed oil, peanut oil, coconut oil, corn oil, castor oil, sesame oil, palm oil, mutton tallow, sperm oil, olive oil, tristearin, triolein and tripalmitin; and (5) fatty acids having more than 14 carbon atoms, such as stearic acid, palmitic acid, oleic acid, linoleic acid and myristic acid.

Sources of available nitrogen include: (1) organic nitrogen compounds, such as proteinaceous materials, e.g., soybean meal, fish meal, casein, whey or whey concentrates, yeast, amino acids and liver cake; and (2) inorganic compounds, such as nitrates or ammonium compounds.

Assimilable cobalt may be supplied to the nutrient medium in a variety of forms. It may be provided in the form of cobalt salts, such as cobalt chloride or cobalt nitrate; or it may be provided in the form of organically-bound cobalt, such as a cobalt-containing yeast, preferably one containing a relatively high proportion of cobalt (i.e., about 100 or more parts per million).

The nutrient media may, of course, contain any of the additional components usually found in such solutions (except, of course, a precursor for the cobalamin desired); among these additional components are antifoam agents (e.g., lard oil, octadecanol, etc.), metallic cations, such as potassium, calcium, magnesium and iron (which may be present in the crude materials used in the nutrient medium), and phosphates (which may be added as inorganic phosphate).

The fermentation process may be carried out at temperatures from about 20° C. to about 40° C. If the microorganism is one which grows under aerobic conditions, a source of oxygen or air should also be present. This aeration can be accomplished by bubbling air (or oxygen) through the medium during the fermentation or by agitating the medium, thereby exposing a large surface thereof to the atmosphere. If the microorganim is anaerobic in nature, of course, this aeration step must then be omitted.

After a sufficient incubation time (about one to ten days), the medium is separated into its liquid and solid components, as by filtration or centrifugation, and the cells are suspended in water (preferably distilled water). This suspension can then, if desired, be again separated into its solid and liquid portions and the solid component resuspended in water. The pH of the final suspension usually is slightly acidic (i.e., pH less than seven). If it is not, an acid such as dilute hydrochloric acid is added to assure acidity. The optimal pH of the finally adjusted suspension is one in the range of about 5 to about 7. To the suspension is added at least the stoichiometrically required amount of precursor to yield the desired cobalamin, and the reaction is allowed to proceed (preferably, expedited by agitating the suspension) until optimum cobalamin formation has occurred. The suspension is then heated (to release the cobalamin from the cells), filtered or centrifuged, and the cobalamin recovered from the liquid portion. As an alternative procedure, the cells after separation from the medium can be lysed as by treatment with a solvent such as acetone or n-propanol before the precursor is added.

The nature of the precursor employed depends on the physiologically active cobalamin desired. Thus, if vitamin $B_{12}$ is desired, 5,6-dimethylbenzimidazole or another vitamin $B_{12}$ precursor, such as 2,3-dimethyl-5,6-diaminobenzene, 2,3-dinitro-5,6-dimethylbenzene or 2,3-dimethyl-4-amino-5-nitrobenzene, may be used. If an "unnatural vitamin $B_{12}$" which possesses vitamin $B_{12}$-like activity is desired, a precursor for the particular cobalamin can be used. Thus, as summarized in the following table, the nature of the resulting cobalamin will depend on the precursor chosen; and since this choice is independent of the first fermentation step, the process of this invention affords a methods whereby a variety of cobalamins can be produced from the product of a single fermentation procedure. In this table, the symbol Y is that in accompanying drawing:

| Precursor | Product (Y-cobalamins) | |
|---|---|---|
| | Name | Y is— |
| 5,6-Dimethylbenzimidazole<br>2,3-Dimethyl-5,6-diaminobenzene<br>2,3-Dinitro-5,6-dimethylbenzene<br>2,3-Dimethyl-4-amino-5-nitrobenzene | 5,6-Dimethylbenzimidazole-cobalamin | 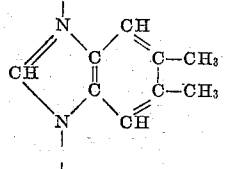 |
| Benzimidazole<br>1,2-Diaminobenzene<br>1,2-Dinitrobenzene<br>1-Amino-2-nitrobenzene | Benzimidazole-cobalamin | 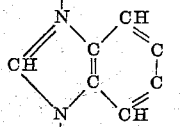 |
| 2-Nitro-4-trifluoromethylaniline<br>5-Trifluoromethylbenzimidazole<br>4-Trifluoromethylphenylene-diamine-1,2 | 5-Trifluoromethylbenzimidazole-cobalamin | 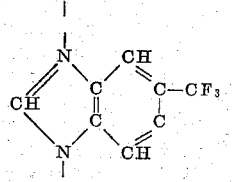 |
| 4-Bromo-6-methoxybenzimidazole<br>3-Bromo-5-methoxyphenylene-diamine-1,2 | 4-Bromo-6-methoxybenzimidazole-cobalamin | 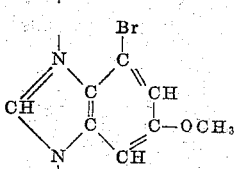 |
| Quinazoline | Quinazoline-cobalamin | 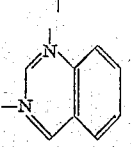 |
| 4(3H)-quinazolinone | 3,4-Dihydro-4-oxoquinazoline-cobalamin | 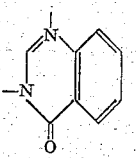 |
| 2,4-Dichloroquinazoline | 2,4-Dichloroquinazoline-cobalamin | 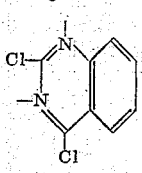 |
| 4-Chloro-8-nitroquinazoline | 4-Chloro-8-nitroquinazoline-cobalamin | 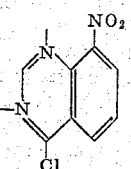 |
| 2(1),4(3)-Quinazolinedione | 1,2,3,4-Tetrahydro-2,4-dioxoquinazoline-cobalamin | 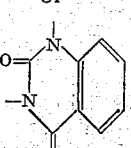 |
| 8-Amino-4-methoxyquinazoline | 8-Amino-4-methoxyquinazoline-cobalamin | 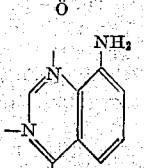 |

| Precursor | Product (Y-cobalamins) | |
|---|---|---|
| | Name | Y is— |
| 2-Methyl-4-methyl-thioquinazoline | 2-Methyl-4-methyl-thioquinazoline-cobalamin. | (structure with CH₃, SCH₃) |
| Phenazine | Phenazine-cobalamin | (phenazine structure) |
| 2-Nitrophenazine | 2-Nitrophenazine-cobalamin | (phenazine with NO₂) |
| 2-Aminophenazine | 2-Aminophenazine-cobalamin | (phenazine with NH₂) |
| 1-Amino-2-hydroxyphenazine | 1-Amino-2-hydroxyphenazine-cobalamin | (phenazine with NH₂, OH) |
| 1-Acetamido-3-methoxyphenazine | 1-Acetamido-3-methoxyphenazine-cobalamin. | (phenazine with NH₂COCH₃, OCH₃) |
| 2-Hydroxyphenazine | 2-Hydroxyphenazin-cobalamin | (phenazine with OH) |
| 5-Methylbenzimidazole | 5-Methylbenzimidazole-cobalamin | (benzimidazole structure) |
| Quinoxaline | Quinoxaline-cobalamin | (quinoxaline structure) |

In the drawing X represents an anion, for example, a hydroxy radical or the anion of an acid (preferably a pharmacologically acceptable acid). Examples of suitable anions are the anions of mineral acids (e.g., chloride, bromide, sulfate, nitrite and nitrate), cyanide, cyanate, etc. If no utilizable anion is present either in the fermentation medium or added with the precursor in the second step, a hydroxy-cobalamin is initially formed (X=OH). If, however, the medium contains a source of anion, such as cyanide, the respective anionic-cobalamin is recovered as the product (e.g., X=CN). Furthermore, if a particular salt is desired, the hydroxy-cobalamin can be converted to the salt by treatment with an acid. Thus, a hydroxy-cobalamin, upon treatment with hydrochloric acid, yields the chloride (X=Cl) or with hydrogen cyanide (or potassium cyanide in an acidic medium) yields the cyanide (X=CN).

Although I do not wish to be limited to any theoretical considerations, it would appear that the initial fermentation step results in the formation of a small amount of a physiologically inactive adenine-cobalamin

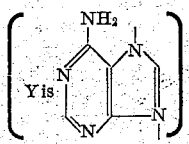

and a "pool" of substances which can be utilized as parts of the cobalamin molecule on the addition of the desired precursor in the presence of the enzymatic system of the washed cells of the microorganism. Thus, it would appear that adenine-hydroxo-cobalamin is formed in the first step of Example 1. Upon addition of 5,6-dimethylbenzimidzole to the aqueous suspension of the washed cells of *Propionibacterium arabinosum*, 5,6-dimethylbenzimidazole-hydroxo-cobalamin is formed. This can be converted to vitamin $B_{12}$ by addition of potassium cyanide in the acidic medium. It would further appear that the adenine-cobalamin is introduced into the aqueous suspension bound to the cells of the microorganism and is subsequently released therefrom either by treatment of the suspension with an acid or because of the inherent acidity of the suspension.

To show the homogeneity and activity of the cyanocobalamins formed in the examples of this invention, the following tests were conducted. For these tests the cyanocobalamin was dissolved in water at a concentration of about 100 micrograms of cyanocobalamin per ml. of water:

TEST I

The solution of the cyanocobalamin is dried on a filter paper strip of Whatman 3 MM paper in parallel with samples of 5,6-dimethylbenzimidazole-cyanocobalamin, adenine-cyanocobalamin, 2-methyl-adenine-cyanocobalamin and Ford's factor B [Ford et al., Biochem. Jour. 59, 86 (1955)]. The sheet is placed in an ionophoresis apparatus [similar to that described by Holdsworth in Nature, 171, 148 (1953)], and the paper is impregnated with a solution of 0.5 N acetic acid containing 0.02% KCN (w./v.). A potential of about 280 volts is applied for about 17 hours. The sheet is removed and dried. When dry (and free from odor of acetic acid), it is applied for 15 minutes to the surface of an agar plate seeded with a suspension of a vitamin $B_{12}$-requiring strain of *Escherichia coli* (ATCC 11105). [The agar medium contains (grams/liter): sucrose, 20 g.; citric acid, 1.2 g.; $(NH_4)_2HPO_4$, 0.4 g.; KCl, 0.08 g.; $MgCl_2 \cdot 6H_2O$, 0.418 g.; $MnCl_2 \cdot 4H_2O$, 0.036 g.; $FeCl_3 \cdot 6H_2O$, 0.023 g.; $ZnCl_2$, 0.021 g.; $CoCl_2 \cdot 6H_2O$, 0.04 g.; agar, 15 g.; triphenyl tetrazolium chloride, 1 g.] After 18 hours' incubation at 37° C., the agar plate is observed. The positions of zones of growth of bacteria (noted as red zones due to the reduction of the tetrazolium dye to the colored formazan) are noted in relation to the location on the paper strip where the samples are applied. The results obtained are recorded in the examples.

TEST II

An aliquot of the solution is applied to a spot about 3 inches from the end of a strip of Whatman No. 1 filter paper parallel to spots of known cobalamins. The chromatogram is developed by the descending method using a solvent mixture containing: 77 ml. of sec.-butanol, 23 ml. of water, 0.25 ml. of KCN solution (5 gms./100 ml.) and 100 mg. of $KClO_4$ for 24 hours (at 25° C.). The strip is dried and applied to the seeded agar plate as in Test 1. After incubation, the zones of growth, representing the presence of vitamins of the $B_{12}$ group (measured with reference to the movement of 5,6-dimethylbenzimidazole-cyanocobalamin), are determined.

TEST III (*a*) An aliquot of the solution is applied to a spot about 3 inches from the end of a strip of Whatman No. 4 filter paper parallel to spots of known cobalamins. The chromatogram is developed by the descending method using a solvent mixture containing: sec.-butanol, 100 ml.; water, 50 ml.; KCN [5% solution (w./v.)], 0.25 ml.; and $NH_4OH$ (concentrated), 1.0 ml. After 17 hours' development (at 35° C.), the strips are dried and plated on seeded agar plates as in Test I. Zones of growth are determined.

( )*b* Same as Test IIIa with 1.0 ml. of glacial acetic acid substituted for the ammonium hydroxide.

TEST IV

An aliquot is assayed for the presence of substances stimulating the growth of *Lactobacillus leichmannii* (ATCC 7830) using as standard 5,6-dimethylbenzimidazole-cyanocobalamin and the method of the U.S. Pharmacopoeia (15th edition). A value is determined.

TEST V

An aliquot is assayed by the method of Ford and Porter [Brit. J. Nutrition, 7, 326 (1953)] using the growth response of *Ochromonas malhamensis* and 5,6-dimethylbenzimidazole-cyanocobalamin as standard. A value is obtained.

The following examples illustrate the invention (all temperatures being in centigrade):

Example 1

VITAMIN $B_{12}$

A medium containing 20 grams autolyzed yeast, 30 grams glucose, 25 milligrams $Co(NO_3)_2 \cdot 6H_2O$ and 1 liter of tap water is prepared, and 500-ml. aliquots are placed in 1-liter Erlenmeyer flasks. The flasks are plugged with non-absorbent cotton and autoclaved at 121 C. for 30 minutes. Approximately 10 grams of powdered calcium carbonate (previously sterilized by heating for at least 3 hours in an oven maintained at 150°) are added to each flask. When the liquid has cooled to 30°, the flasks are inoculated with 10 ml. of 2-day-old culture of *Propionibacterium arabinosum* ATCC 4965 (American Type Culture Collection, Washington, D.C.) grown on this medium. The flasks are then placed on a reciprocating shaker (120 1-inch cycles per minute), located in a constant temperature room maintained at 30°. After 48 hours' to 74 hours' incubation, the cells, debris and calcium carbonate in the flask are collected by centrifucation. The collected solids are resuspended in a volume of distilled water equal to the original, shaken on a reciprocating shaker (280 1-inch cycles per minute) for 5 minutes and recentrifuged. The washed solids are resuspended in distilled water (equal in volume to half the original volume), and aliquots are distributed into flasks (20 ml. per 125-ml. Erlenmeyer flasks or square-base 6-oz. bottle is a convenient volume). The pH of the suspension is about pH 6.2. Approximately 200μg. of 5,6-dimethylbenzimidazole is added to one of the series of flasks, and the flasks are placed on a reciprocating shaker (120 1-inch cycles per minute), located in a room maintained at 30°. After 20 hours' agitation, the pH of the suspension rises to about 6.7. The contents of the flasks are heated at 85 to 90° C. for 20 minutes (in a boiling water bath), and the suspension is centrifuged. Approximately 0.5 ml. of an aqueous solution of KCN (5 g./100 ml.) is added to 20 ml. of the supernatant liquid. An aliquot of this supernatant liquid (hereinafter referred to as the supernatant liquid) is analyzed for the presence of substances stimulating the growth of *Lactobacillus leichmannii* (ATCC 7830), using as standard 5,6-dimethylbenzimidazole-cyanocobalamin and the method in the U.S. Pharmacopoeia (fifteenth edition) (Test IV). A value of about 0.9 mg. per liter is obtained. Another aliquot approximately 10 ml. in volume is shaken with 10 ml. of a mixture of phenol and benzene (70 parts 88% phenol–30 parts benzene). The mixture is centrifuged, and the upper layer (ca. 8 ml.) is transferred to a test tube. An equal volume of n-butanol is added to this phenol-benzene extract, and the solution is shaken briefly. Five ml. of water is then added, the mixture shaken on a reciprocating shaker for 10 minutes and then centrifuged. The bottom aqueous layer (hereinafter called the aqueous concentrate) is removed and analyzed by the following tests:

TEST I

In this test the major cobalamins present in the aqueous concentrate has a mobility equal to that of 5,6-dimethylbenzimidazole-cyanocobalamin. There is also some adenine-cyanocobalamin present. A sample of the aqueous concentrate from a cell-suspension which had not been supplemented with the 5,6-dimethylbenzimidazole shows only the presence of adenine-cyanocobalamin.

TEST II

In this test the major cobalamin present in the aqueous concentrate has a mobility equal to that of 5,6-dimethylbenzimidazole-cyanocobalamin. There is also a cobalamin present which has a mobility about 0.35 that of the 5,6-dimethylbenzimidazole-cyanocobalamin or equal to that of adenine-cyanocobalamin. The aqueous concentrate from the unsupplemented cell-suspension shows only the presence of adenine-cyanocobalamin.

TEST IIIa

In this test the major cobalamin present in the aqueous concentrate has a mobility equal to that of 5,6-dimethylbenzimidazole-cyanocobalamin. There is also a cobalamin present with a mobility about 0.6 that of the 5,6-dimethylbenzimidazole-cyanocobalamin. A sample of the aqueous concentrate from the unsupplemented cell-suspension shows only the presence of adenine-cyanocobalamin.

TEST IIIb

In this test the major cobalamin present in the aqueous concentrate has a mobility equal to that of 5,6-dimethylbenzimidazole-cyanocobalamin. There is also present a cobalamin with a mobility about 0.45 that of the 5,6-dimethylbenzimidazole-cyanocobalamin which corresponds to that obtained with adenine-cyanocobalamin. A sample of the aqueous concentrate from the unsupplemented cell-suspension shows only the presence of adenine-cyanocobalamin.

TEST V

Another aliquot of the supernatant liquid is assayed for the presence of substances stimulating the growth of Ochromonas malhamensis, using the method of Ford and Porter [Brit. J. Nutrition, 7, 326 (1953)] with 5,6-dimethylbenzimidazole-cyanocobalamin as standard. A value of about 0.59 mg. per liter is obtained. When an aliquot of the supernatant liquid from an unsupplemented cell-suspension is assayed, a value of <0.01 mg. per liter is obtained.

Other substances which may be used instead of the 5,6-dimethylbenzimidazole in the procedure of Example 1 include: 2,3-dimethyl-5,6-diaminobenzene; 2,3-dinitro-5,6-dimethylbenzene; or 2,3-dimethyl-4-amino-5-nitrobenzene. The cell-suspension may be shaken in an atmosphere of nitrogen instead of air without affecting the biosynthesis of the cobalamin.

*Example 2*

VITAMIN B₁₂

The same procedure as used in Example 1 is used with a culture of *Propionibacterium pentosaceum* ATCC 4875 instead of the *P. arabinosum*. The supernatant liquid contains about 0.87 mg. per liter of 5,6-dimethylbenzimidazole-cyanocobalamin as measured by the *L. leichmannii* bioassay (Test IV) and 0.38 mg. per liter as determined by the *O. malhamensis* bioassay (Test V). The supernatant liquid from the unsupplemented cell-suspension contained about 0.79 mg. per liter as determined by the *L. leichmannii* bioassay and <0.01 mg. per liter as determined by the *O. malhamensis* bioassay. When this solution is extracted with the phenol-benzene solution, the aqueous concentrate is found to contain 5,6-dimethylbenzimidazole-cyanocobalamin and a small amount of adenine-cyanocobalamin, as shown by the results of Tests I to V, described in Example 1.

The same results are obtained when 2,3-dimethyl-5,6-diamino benzene is substituted for the 5,6-dimethylbenzimidazole. Incubation of the cell-suspension under anaerobic conditions, e.g., under an atmosphere of nitrogen, did not affect the biosynthesis of cobalamins, as determined by the bioassays and the response to Tests I to V.

*Example 3*

BENZIMIDAZOLE-CYANOCOBALAMIN

The procedure described in Example 1 is used with the replacement of the 5,6-dimethylbenzimidazole with benzimidazole. The bioassay of the supernatant liquid shows about 0.9 mg. per liter of activity by the *L. leichmannii* assay (Test IV) and 0.31 mg. per liter by the *O. malhamensis* bioassay (Test V); in both assays, 5,6-dimethylbenzimidazole-cyanocobalamin is used as standard. Analysis of the aqueous concentrate prepared as in Example 1 shows the presence of an ionophoretically neutral cobalamin (by Test I). The major cobalamin in the aqueous concentrate has a mobility about 0.9 that of 5,6-dimethylbenzimidazole-cyanocobalamin in Test II, 0.95 in Test IIIa and 0.95 in Test IIIb. These are approximately the values obtained with benzimidazole-cyanocobalamin in these tests.

The same results are obtained when o-phenylene diamine or o-dinitrobenzene is substituted for the benzimidazole.

*Example 4*

BENZIMIDAZOLE-CYANOCOBALAMIN

The procedure described in Example 2 is used with the replacement of the 5,6-dimethylbenzimidazole with benzimidazole. The bioassay of the supernatant liquid shows about 0.8 mg. per liter of activity by the *L. leichmannii* assay and 0.27 mg. per liter by the *O. malhamensis* bioassay (in both assays 5,6-dimethylbenzimidazole-cyanocobalamin is used as a standard). Analysis of the aqueous concentrate shows the presence of benzimidazole-cyanocobalamin, as described in Example 3.

*Example 5*

5-TRIFLUOROMETHYLBENZIMIDAZOLE-CYANOCOBALAMIN

The procedure used in Example 1 is used with the replacement of the 5,6-dimethylbenzimidazole with α,α,α-trifluoromethyl-2-nitro-p-toluidine. The bioassay of the supernatant liquid shows about 0.8 mg. per liter of activity by the *L. leichmannii* assay and 0.19 mg. per liter by the *O. malhamensis* bioassay (in both assays 5,6-dimethylbenzimidazole-cyanocobalamin is used as a standard). Analysis of the aqueous concentrate by the procedure of Test I shows the presence of a neutral cobalamin (ionophoretically). Analysis of the aqueous concentrate by Test II shows a cobalamin with a mobility of about 0.95 that of the 5,6-dimethylbenzimidazole-cyanocobalamin, and the same result is obtained when analysis is made of the aqueous concentrate by the procedures of Tests IIIa and IIIb. When 3,4-diamino-α,α,α-trifluoromethyltoluene is substituted for the trifluoro-2-nitro-p-toluidine, the same results are obtained.

*Example 6*

5-TRIFLUOROMETHYLBENZIMIDAZOLE-CYANOCOBALAMIN

The procedure described in Example 2 is used with the replacement of the 5,6-dimethylbenzimidazole with α,α,α-trifluoro-2-nitro-p-toluidine. The bioassay of the supernatant liquid is about 0.7 mg. per liter as measured by the *L. leichmannii* bioassay (using 5,6-dimethylbenzimidazole-cyanocobalamin as standard). Analysis of the aqueous concentrate by the procedures of Tests I to IIIb gives the same results described in Example 5.

Example 7

5-METHYLBENZIMIDAZOLE-CYANOCOBALAMIN

The procedure of Example 1 is used with the replacement of the 5,6-dimethylbenzimidazole with 5-methylbenzimidazole. The bioassay of the supernatant liquid shows about 0.9 mg. per liter as measured by the *L. leichmannii* assay and 0.23 mg. per liter as measured by the *O. malhamensis* bioassay (in both assays 5,6-dimethylbenzimidazole-cyanocobalamin is used as a standard). Analysis of the aqueous concentrate by the procedure of Test I shows the presence of an ionophoretically neutral cobalamin. Analysis of the aqueous concentrate by the procedure of Test II shows the presence of a cobalamin with a mobility of about 0.88 that of 5,6-dimethylbenzimidazole-cyanocobalamin, while when the aqueous concentrate is analyzed by the procedures of Tests IIIa and IIIb, the cobalamin has a mobility equal to that of the 5,6-dimethylbenzimidazole-cyanocobalamin.

Example 8

QUINOXALINE-CYANOCOBALAMIN

The procedure used in Example 1 is used with the replacement of 5,6-dimethylbenzimidazole with quinoxaline hydrochloride. The bioassay of the supernatant liquid is approximately 0.8 mg. per liter when measured by the growth response of *L. leichmannii* (with 5,6-dimethylbenzimidazole-cyanocobalamin as standard). Examination of the aqueous concentrate by the procedure of Test I shows an ionophoretically neutral cobalamin. When the aqueous concentrate is analyzed by the procedure of Test II, a cobalamin with a mobility of 0.86 that of 5,6-dimethylbenzimidazole-cyanocobalamin is found. When the aqueous concentrate is analyzed by the procedure of Test IIIb, a new cobalamin with a mobility of 0.9 that of the 5,6-dimethylbenzimidazole-cyanocobalamin is found, while when the procedure of Test IIIa is used, the new cobalamin has a mobility of 0.7 that of the 5,6-dimethylbenzimidazole-cyanocobalamin.

Example 9

2-HYDROXYPHENAZINE-CYANOCOBALAMIN

A culture of *Propionibacterium arabinosum* (obtained as in Example 1) is grown on the autolyzed yeast-glucose-$Co(NO_3)_2 \cdot 6H_2O$—$CaCO_3$ medium of Example 1 for two days (without the inclusion in the medium of a phenazine precursor). At the end of this period, the solids (cells, debris and $CaCO_3$) are separated from the liquid by centrifugation and resuspended in a volume of distilled water so that the cell concentration is approximately the same as before centrifugation. The suspension is well agitated and the solids collected again by centrifugation. These solids are then resuspended in distilled water equivalent to half the volume before centrifugation. Aliquots of this suspension are distributed into flasks (20 ml. per 125-ml. Erlenmeyer flask is a convenient volume), and 1 ml. of an aqueous solution of 2-phenazinol is added to one of the groups so that the concentration of phenazinol is approximately 10 mg. per liter. These flasks are placed on a reciprocating shaker (120 1-inch strokes per minute), located in a room maintained at 30°. After 18 hours' shaking, 0.5 ml. of 5% KCN is added, and the contents of the flasks are heated at 85 to 90° for 30 minutes in a boiling water bath. The solids are collected by centrifugation and the supernatant liquid extracted with a phenol-benzene solution as in Example 1. An aliquot of the supernatant solution, when assayed by the *L. leichmannii* assay (see Example 1), gives a value of 1.03 γ/ml.; and when the *Ochromonas malhamensis* assay is used, the value is 0.52 γ/ml. The benzene extracts are pooled, an equal volume of n-butanol is added and the mixture extracted with 1/10 its volume of water. The aqueous layer is separated and analyzed by the tests described hereinbefore.

When analyzed by the ionophoretic method (pH 2.5), the cobalamin formed, (2-hydroxyphenazin-9,10-diyl)-cyanocobalamin, is ionophoretically neutral. When analyzed by the filter paper chromatographic method using the sec.-butanol, water, KCN and acetic acid system, the cobalamin has a mobility about 0.8 that of 5,6-dimethylbenzimidazole-cyanocobalamin. (When samples are taken from cell suspensions which have not been supplemented with any phenazines, only adenine-cyanocobalamin appears to be present.)

Example 10

BENZOTRIAZOLE-CYANOCOBALAMIN

The procedure of Example 1 is used with the replacement of 5,6-dimethylbenzimidazole with benzotriazole. The bioassay of the supernatant liquid is 0.9 mg. per liter as measured by the *L. leichmannii* method and 0.3 mg. per liter as measured by the *O. malhamensis* bioassay (using 5,6-dimethylbenzimidazole-cyanocobalamin as a standard). Analysis of the aqueous concentrate by the procedure of Test I shows the presence of an ionophoretically neutral cobalamin. Analysis of the aqueous concentrate by the procedure of Test II shows the presence of a cobalamin with a mobility of 1.05 that of 5,6-dimethylbenzimidazole-cyanocobalamin, while when the procedure of Test IIIb is used, the new cobalamin has a mobility equal to that of 5,6-dimethylbenzimidazole-cyanocobalamin. When the procedure of Test IIIa is used, the new cobalamin has a mobility of about 0.3 that of 5,6-dimethylbenzimidazole-cyanocobalamin.

The cyanocobalamins formed in each of the examples can be converted to the corresponding hydroxocobalamin derivatives by treatment of the former with hydrogen in the presence of platinum oxide in an aqueous medium. The hydroxocobalamins, thus formed, can then be converted to any desired salt by treatment with the appropriate acid in an aqueous medium.

The vitamin $B_{12}$ and other biologically active cobalamins formed in each of the examples can be used in lieu of otherwise-produced vitamin $B_{12}$ in promoting growth of chicks. For this purpose, the cobalamin-containing supernate may be merely dried, to provide a cobalamin concentrate; or the cobalamin may be recovered from the supernate or dried concentrate by use of conventional vitamin $B_{12}$ purification expedients. The dosage employed (e.g., when added as a supplement to chick feeds) would depend on the potency of the concentrate, or potency of the isolated non-$B_{12}$ cobalamin, relative to pure vitamin $B_{12}$. The invention may be otherwise variously embodied within the scope of the appended claims.

I claim:

1. A process for preparing a physiologically active cobalamin, which consists of culturing a precursor-requiring vitamin $B_{12}$-producing microorganism in a cobalt-containing nutrient medium substantially free of precursor, separating the cells from the medium to obtain resting cells, treating said separated resting cells with a precursor and recovering the resulting physiologically active cobalamin.

2. The process of claim 1, wherein the treatment with precursor is conducted under acidic conditions.

3. The process of claim 1, wherein the microorganism is of the genus Propionibacterium.

4. The process of claim 1, wherein the microorganism is *Propionibacterium arabinosum*.

5. The process of claim 1, wherein the microorganism is *Propionibacterium pentosaceum*.

6. The process of claim 1, wherein the precursor is 5,6-dimethylbenzimidazole and a 5,6-dimethylbenzimidazole-cobalamin is recovered.

7. The process of claim 1, wherein the precursor is benzimidazole, and a benzimidazole-cobalamin is recovered.

8. The process of claim 1, wherein the precursor is α,α,α-trifluoromethyl-2-nitro-p-toluidine, and a 5-trifluoromethylbenzimidazole-cobalamin is recovered.

9. The process of claim 1, wherein the precursor is 5-methylbenzimidazole, and a 5-methylbenzimidazole-cobalamin is recovered.

10. The process of claim 1, wherein the precursor is quinoxaline, and a quinoxaline-cobalamin is recovered.

11. A process for preparing a 5,6-dimethylbenzimidazole-cobalamin, which consists of culturing a precursor-requiring vitamin $B_{12}$-producing microorganism of the genus Propionobacterium in a cobalt-containing nutrient medium substantially free of precursor, separating the cells from the medium to obtain resting cells, treating said separated resting cells with 5,6-dimethylbenzimidazole under acidic conditions and recovering the resulting 5,6-dimethylbenzimidazole-cobalamin.

12. The process of claim 11 wherein the microorganism is *Propionibacterium arabinosum*.

13. The process of claim 11 wherein the microorganism is *Propionibacterium pentosaceum*.

References Cited in the file of this patent

UNITED STATES PATENTS

| | | |
|---|---|---|
| 2,715,602 | Hargrove et al. | Aug. 16, 1955 |
| 2,764,521 | Leviton | Sept. 25, 1956 |
| 2,842,540 | Perlman | July 8, 1958 |
| 2,893,988 | Bernhauer et al. | July 7, 1959 |

OTHER REFERENCES

Germany, A19703 1Va/30h, March 8, 1956.